United States Patent Office 3,642,741
Patented Feb. 15, 1972

3,642,741
COPOLYMERS OF VINYL CHLORIDE AND
EPOXY-α-OLEFINS
Robert Bacskai, Berkeley, Calif., assignor to Chevron
Research Company, San Francisco, Calif.
No Drawing. Filed Dec. 23, 1968, Ser. No. 786,379
Int. Cl. C08f 5/00
U.S. Cl. 260—87.5
5 Claims

ABSTRACT OF THE DISCLOSURE

Copolymers of vinyl chloride and ω-epoxy-α-olefins of 5 or more carbon atoms are provided having improved resistance to heat degradation and which are clear and uncolored.

BACKGROUND OF THE INVENTION

This invention relates to copolymers of vinyl chloride and epoxy containing α-olefins of 5 or more carbon atoms and to objects made from said copolymers.

Polyvinyl chloride is well known in the polymer art and has a variety of diverse applications. However, for most of these applications, it is necessary that the polymer be heated at elevated temperature. For example, in making fibers, the polymer is dissolved in an inert, organic solvent, heated to an elevated temperature to increase solubility, and is then held at this elevated temperature during spinning operations. In another application, films are formed from polyvinyl chloride by heating the polymeric resin to temperatures of about 135 to 190° C. while under pressure. The hot, viscous resin is then extruded or forced through a thin slit, thereby forming a single, continuous film. It has been found in both of these applications that the polymer undergoes color degradation as evidenced by a progressive yellowing or darkening. As a result it has been customary to add thermal stabilizers to polyvinyl chloride prior to any heat treatment.

A particularly good thermal stabilizer system for polyvinyl chloride is a synergistic combination of a metal such as barium or cadmium in the form of a soap with an epoxy compound. These combinations are physically incorporated into the polymer in much the same way as plasticizers are. U.S. Pat. No. 3,050,783 describes such combinations. Furthermore epoxy compounds can be used alone as the sole stabilizer. Among the common epoxy stabilizers are the epoxidized oils and esters, glycidyl alcohol ethers, oxacrylates, phenoxypropylene oxide, etc. But whether used alone or in synergic combination it has been found that these epoxy compounds have a tendency to sweat out of the polymer after sufficient exposure to heat and light thereby limiting their usefulness.

SUMMARY OF THE INVENTION

It has now been found that copolymers may be prepared from vinyl chloride and epoxy-containing α-olefins, and that these copolymers have improved resistance to heat as compared to polyvinyl chloride itself and furthermore the epoxy compound has no tendency to exude.

DESCRIPTION OF THE PREFERRED EMBODIMENTS

Useful concentrations of epoxy compounds are within the range of 0.5 to 5% by weight based on polyvinyl chloride. The preferred concentration is in the range of 2 to 4% epoxy compound.

The olefin epoxides which can be used in this copolymerization have the following structure:

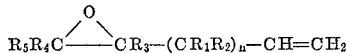

wherein $n$ is an integer in the range of from 1 to 16 and $R_1$, $R_2$, $R_3$, $R_4$ and $R_5$ are H, or lower molecular weight alkyl groups having a total carbon number less than 20. The preferred compounds are the ω-epoxides in which $R_1$, $R_2$, $R_3$, $R_4$ and $R_5$ are all H and $n$ has a value of 2, 3 or 4.

The epoxy containing α-olefins are prepared from the corresponding diolefins by a partial epoxidation. Such epoxidations are carried out by reacting the olefin with a peroxide, e.g. peracetic acid or trifluoroperacetic acid. A description of the reaction is given in the Journal of the American Chemical Society, vol. 77, p. 89 (1955). For example, 6-epoxy-1-heptene is prepared from a 1:1 molar mixture of 1,6-heptadiene and trifluoroperacetic acid.

Among the epoxy containing olefins useful in this process are the following: 4-epoxy-1-pentene, 5-epoxy-1-hexene, 4-epoxy-1-hexene, 8-epoxy-1-nonene, 11-epoxy-1-dodecene, 8-epoxy-1-dodecene, 3,3-dimethyl-4-epoxy-1-decene, 3,3,5-trimethyl-4 - epoxy-1-hexene, 3,3,4,5-tetramethyl-4 - epoxy-1-heptene, 15-epoxy-1-hexadecene, 13-epoxy-1-tetradecene, and 3,3,4,5-tetrabutyl - 4-epoxy-1-nonene.

The following examples illustrate various copolymers of this invention and specific methods for preparing them. These examples are in no manner intended to limit the invention described herein. Unless otherwise indicated, percentages are by weight.

EXAMPLE 1

Preparation of 7-epoxy-1-octene (a) A three-necked 500 ml. round bottom flask equipped with a stirrer, reflux condenser, thermometer, drying tube, and dropping funnel was charged with 100 ml. of dichloromethane, and 16.4 ml. (0.6 mole) of 90% hydrogen peroxide. This solution was cooled in an ice bath, and 101.6 ml. (0.72 mole) of trifluoroacetic anhydride was added to it over a period of 35 minutes. During this time the temperature was in the range of 5 to 10° C. After the addition was complete, the reaction mixture was stirred for an additional 15 minutes while holding the temperature at <50° C.

(b) A separate three-necked 2 liter round bottom flask equipped as before was charged with 500 ml. of dichloromethane, 190 g. (1.8 moles) of anhydrous sodium carbonate and 66.0 g. (0.6 mole) of 1,7-octadiene (B.P. 55–55° C./85 mm.). Then the trifluoroperacetic acid (prepared in Example 1(a)) was added dropwise over a period of 75 minutes. The temperature was 36–38° C. (refluxing dichloromethane). When all of the acid was added the mitxure was heated to maintain gentle reflux and it was stirred for an additional 30 minutes. It was then cooled in ice water and centrifuged to separate the liquid and solid layers. The solid layer was extracted with dichloromethane which in turn was added to the separated liquid phase, and the combined solution, filtered. The dichloromethane was removed by evaporation and the remainder distilled to give 22.4 g. of 7-epoxy-1-octene having a boiling point of 76–78° C./34 mm.

A vapor phase chromatographic analysis showed that this fraction was over 99% one compound. An infrared analysis showed strong adsorption at 1260 and at 832–835 cm.$^{-1}$.

An NMR analysis confirmed the structure to be 7-epoxy-1-octene.

EXAMPLE 2

Preparation of a vinyl chloride/7-epoxy-1-octene copolymer

An autoclave was purged with nitrogen and then charged with 485 ml. of distilled water and 15 ml. of a 1% methocel solution. After cooling this mixture to about 5° C., 0.05 ml. of isopropylperoxycarbonate, 6.3 g. (0.05 mole) of 7-epoxy-1-octene (from Example 1(b)), and 90 g. (1.45 moles) of vinyl chloride were addded. The autoclave was sealed, and the mixture was stirred for 16 hours at 50° C.

At the end of this time, the autoclave was cooled to room temperature and opened. The polymer was removed, filtered, washed with water, and with n-pentane, and finally dried at 50° C. In this way there was obtained 44.37 g. of copolymer having an intrinsic viscosity of 0.44 (measured in dimethylformamide at 110° C.).

A portion of this polymer was purified by dissolving it in tetrahydrofuran, and then reprecipitating it by slowly pouring the solution into n-pentane. After repeated washing and extracting with n-pentane, the purified copolymer was dried. An infrared analysis of this copolymer sample showed adsorption at 1260 cm.$^{-1}$ and at 833 cm.$^{-1}$, both indicating the presence of an epoxide group in the polymer.

EXAMPLE 3

Preparation of 5-epoxy-1-hexene

Essentially the same procedure as in Example 1 was followed to give 14.8 g. of 5-epoxy-1-hexene (B.P. 114–116° C.) from 49 g. of 1,5-hexadiene.

EXAMPLE 4

Preparation of a vinyl chloride/5-epoxy-1-hexene copolymer

Essentially the same procedure as in Example 2 was followed to give 44 g. of copolymer having an intrinsic viscosity of 0.54.

Again a portion of this copolymer was purified by dissolving in tetrahydrofuran, followed by reprecipitating, washing and extracting with n-pentane as in Example 2. An infrared analysis showed adsorption at 1260 and 834 cm.$^{-1}$, typical of epoxide groups.

EXAMPLE 5

Preparation of polyvinyl chloride

Polyvinyl chloride was prepared and purified by essentially the same procedure as Example 2, but in the absence of 7-epoxy-1-octene. The final polymeric product had no infrared adsorption at 1260 cm.$^{-1}$.

EXAMPLE 6

Preparation of polymeric films

A hand operated, laboratory hydraulic press having heated platens and a 2 inch diameter circular disc die was charged with 2 g. of the copolymer of Example 2. The platens were at a temperature of 160° C. when the polymer was added. The press was closed for 20 seconds to permit the polymer to heat up. The pressure was then increased to 10 tons and held there for 20 seconds. At the end of this time, the press was opened and the film transferred to a cold press where it was kept under 10 tons pressure until it had cooled to room temperature. The cold film disc, 2 inches in diameter and 1 mm. thick, was then removed and examined for color and plastic properties.

The same procedure was repeated with the products of Examples 4 and 5.

The film made from the product of Example 5 (polyvinyl chloride) was brown in color. The other two samples, made from polyvinyl chloride containing chemically bound epoxy compounds, were clear and uncolored.

EXAMPLE 7

Preparation and testing metal stabilized polymeric film

Each of the powdery polymeric products of Examples 2, 4 and 5, 5 g., were well mixed with an acetone solution containing 0.1 g. of a commercial (Ferro 203) cadmium octoate solution (manufacturer's recommended dosage is from 1.5 to 3.0 parts of octoate solution per hundred parts of polyvinyl chloride). After mixing, the acetone was removed by evaporation.

Test specimens were formed in the same hydraulic press. This time the die was an aluminum sheet, 0.001 inches thick, containing a 2½ by 1 inch rectangular opening. One gram of the test polymer was charged to this apparatus which was preheated to 180° C. After adding the polymer, the press was operated as in Example 6. The cold films, about 10 mils in thickness were then examined for color and plasticity. In each case the film specimen was flexible, clear and colorless.

These specimens were then treated to an accelerated thermal stability test by heating them at 150° C. for 30 minutes. At the end of this test, the film made from the product of Example 5 (polyvinyl chloride) was an opaque black in color. The other two samples, prepared from epoxy containing copolymers were transparent and only a very pale yellow color.

Examples 6 and 7 show the benefits in thermal color stability obtained by incorporating an epoxy compound in polyvinyl chloride. The reprecipitations and extractions of the polymeric powders removed all unpolymerized epoxy compounds and thereby insure that the remaining epoxy compounds are copolymerized with the vinyl chloride. This is surprising in view of the teaching of U.S. Pat. No. 2,822,355 wherein an unsaturated epoxy compound

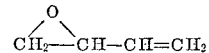

is used to stop or limit vinyl chloride polymerization.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

What is claimed is

1. A film-forming solid copolymer of vinyl chloride and from 0.5 to 5% by weight based on the vinyl chloride of olefin epoxide having the following structure:

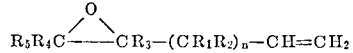

wherein $n$ is an integer in the range of from 1 to 16 and $R_1$, $R_2$, $R_3$, $R_4$ and $R_5$ are H, or low molecular weight alkyl groups having a total carbon number less than 20, said copolymer being clear and uncolored and having improved resistance to degradation.

2. The copolymer of claim 1 in which $R_1$, $R_2$, $R_3$, $R_4$, and $R_5$ of the olefin epoxide are all H and $n$ has a value of 2, 3 or 4.

3. The copolymer of claim 1 in which the olefin epoxide is 7-epoxy-1-octene.

4. The copolymer of claim 1 in which the olefin epoxide is 5-epoxy-1-hexene.

5. A polyvinyl chloride film having improved thermal stability composed of the copolymer of claim 1.

References Cited

UNITED STATES PATENTS

| | | | |
|---|---|---|---|
| 2,570,601 | 10/1951 | Schmerling | 260—82.1 |
| 2,822,355 | 2/1958 | Werner | 260—87.5 |
| 3,366,610 | 1/1968 | Anderson | 260—87.5 F |
| 3,414,634 | 12/1968 | Sorkin | 260—87.5 F |

JOSEPH L. SCHOFER, Primary Examiner

J. A. DONAHUE, Jr., Assistant Examiner